No. 730,515. PATENTED JUNE 9, 1903.
B. D. COLBY.
LOCK FOR AUTOMOBILES.
APPLICATION FILED NOV. 14, 1902.
NO MODEL.

Witnesses:
Ira D. Perry
Herman M. Krueger

Inventor:
B. D. Colby
by Elliott & Hopkins
Attys.

No. 730,515. Patented June 9, 1903.

UNITED STATES PATENT OFFICE.

BENJAMIN DORR COLBY, OF CHICAGO, ILLINOIS.

LOCK FOR AUTOMOBILES.

SPECIFICATION forming part of Letters Patent No. 730,515, dated June 9, 1903.

Application filed November 14, 1902. Serial No. 131,292. (No model.)

*To all whom it may concern:*

Be it known that I, BENJAMIN DORR COLBY, a citizen of the United States, residing at Chicago, in the county of Cook and State of Illinois, have invented certain new and useful Improvements in Locks for Automobiles, of which the following is a full, clear, and exact specification.

This invention relates to means for locking automobiles and other similar vehicles, so that the same may not be tampered with by unauthorized persons.

Automobiles usually possess two or more levers or actuating members necessary for the operation and control of the vehicle, and in the use of such a vehicle it is desirable that when it is left standing it have its controlling devices so locked that not only will there be ample assurance that the vehicle will not be pushed or pulled away by mischievous persons, but also that the machine will not be set in motion or, if left in motion, as often desirable with the explosive types of motors, it may neither be stopped nor connected with the driving-gear.

My invention therefore has for its primary object to provide an improved lock which will conveniently secure two or more of the levers or members which control the vehicle or its machinery.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
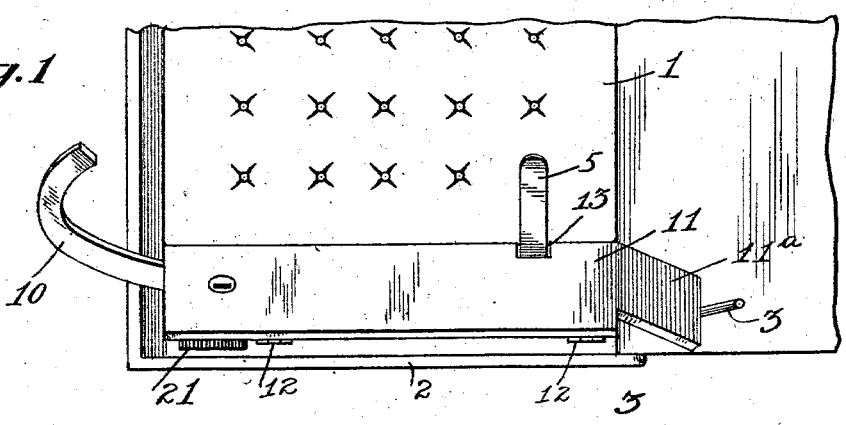
Figure 2:
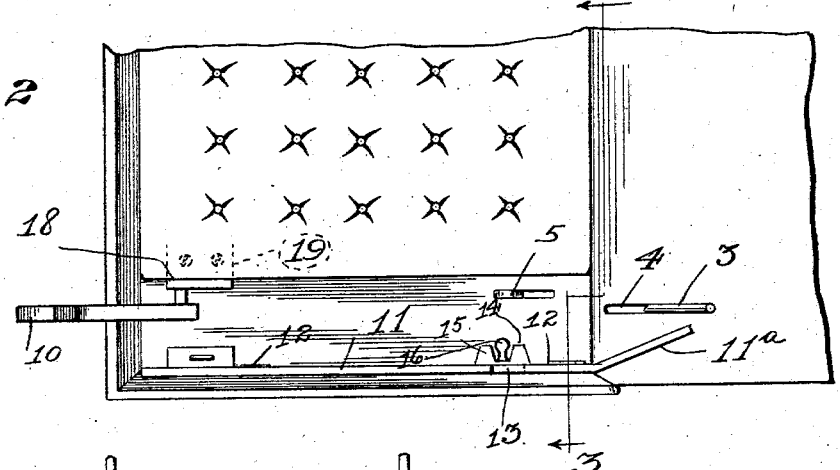
Figure 4:
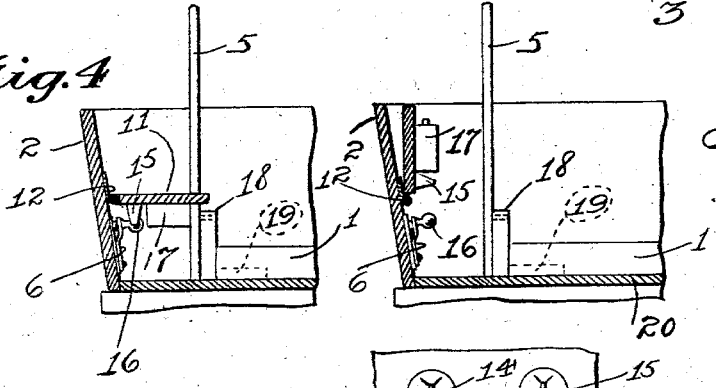
Figure 3:
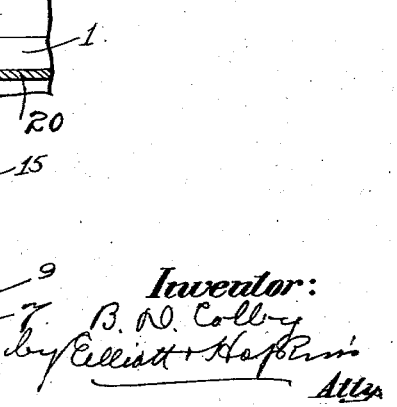
Figure 5:
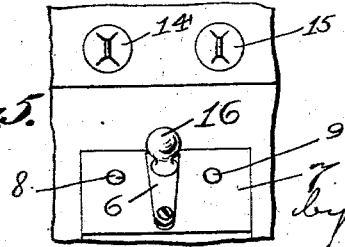

In the said drawings, Figure 1 is a perspective view of my improved lock as applied to the end of the seat of an automobile where a number of the controlling levers or members are situated or grouped, showing all of the same secured by the lock. Fig. 2 is a plan view thereof, showing them released. Fig. 3 is a cross-section on the line 3 3, Fig. 2, showing the lock unlocked. Fig. 4 is a similar section showing the lock locked, and Fig. 5 is a detail view of the electric switch and the under side of the locking-plate with the locking-plate thrown back and disclosing the means for locking the switch.

As a suitable type of automobile for illustrating the application of my invention, I have selected the gasolene form of machine commonly known as the "Oldsmobile," in which the principal levers for controlling the vehicle and the mechanism are situated at the right-hand end of the cushion 1, between the end of the cushion and the inclined side wall 2 of the seat box or frame. These levers or controlling devices comprise a lever or member 3, which is usually so mounted as to project through a suitable slot 4 in the front side of the seat-box and which oscillates in a vertical plane in such a way as to control the time of ignition of the engine, making the ignition late and the speed consequently slow when the lever is pushed downward and early and the speed consequently high when the lever is pulled upward; an upright lever 5, which controls the driving or transmission gear in such a way that when the lever 5 stands vertically the clutch mechanism of said gear is out of engagement and no matter how fast the motor may run the power is not applied to the driving-wheels, but when the lever 5 is pushed in one direction the machine goes forward at a greater or less speed, according to the degree of deflection of the lever, or when pushed in the other direction it backs up; a switch 6, which is usually mounted or pivoted upon a plate 7, secured to the inner face of the wall 2 of the seat-box and adapted to contact with either of two electrical contacts 8 9 for deriving current from either set of batteries, two sets being usually carried, so that a fresh set may be on hand ready for use when the old set is exhausted, it being understood that as long as the switch 6 stands on either of the contacts 8 9 the engine will be supplied with electric current for keeping it in motion, and when it stands at an intermediate point, as shown in the drawings, the engine cannot be started, and, lastly, a lever 10, which is the emergency-brake lever and which is so connected to the brake in the usual or any suitable way that when it is thrown forward or from left to right from the position shown in Fig. 1 the emergency-brake will be released, but when it is pulled up or thrown back in the position indicated in Fig. 1 the emergency-brake will be applied. The lock comprising my invention is capable of securing two or more of these controlling levers or devices and also, when desired, of controlling all of them when set in the position illustrated in Fig. 1.

The form of lock illustrated as an example of my invention consists of a flat plate 11, which may be hinged to any convenient part of the vehicle, such as the side wall 2, by means of hinges 12 in such a way that when desired it may be thrown down into a horizontal position, bringing one end against the lever 10, should this lever be in its elevated position, as indicated in Fig. 1, while its opposite end, which is turned downwardly, as shown at $11^a$, impinges the igniter-lever 3 and holds it at the limit of its downward movement, where the speed of the engine is lowest, while the opposite edge of the plate is formed with a notch 13, which embraces the clutch or transmission-gear lever 5 and holds the same in the position it assumes when the clutches of the gear are out of engagement. Should it be desired to lock the other levers without applying the emergency-brake, the lever 10 would be allowed to remain in its lowered horizontal position, where it will lie under the plate 11 and not interfere with the latter being lowered for locking the other levers. Should it be desired to leave the engine running and to insure against its being stopped by unauthorized persons, the switch 6 would be thrown onto one of the contacts 8 9, and it would be held in that position by one of a pair of stops 14 15, each of which is beveled on both sides, as shown in Fig. 5, and secured to the under side of plate 11 in such a position that when the plate is thrown down one of the stops 14 15 will engage one side of the knob 16 of the switch, and consequently hold the switch on the contact 8 or 9. On the other hand, should it be desired to lock the switch, so that the engine may not be started nor the battery allowed to exhaust itself, the switch would be placed in the intermediate position (shown in Fig. 5) and in which position the stops 14 15 will engage on opposite sides of the knob 16 when the locking-plate 11 is thrown down.

The plate 11 may be locked in its lowered position by any suitable means, such as a lock 17, secured to the under side thereof and engaging a keeper 18, formed on or secured to suitable bracket 19, riveted or bolted to the top 20 of the seat, and, if desired, the hinge of the plate 11 may be provided with a spring 21 for holding the plate in its elevated or released position, as shown in Fig. 3, so as to avoid interfering with the proper operation of the levers.

Having thus described my invention, what I claim as new therein, and desire to secure by Letters Patent, is—

1. In a lock for automobiles the combination of two or more members or levers for controlling the automobile or its machinery and a locking means simultaneously engaging or holding two or more of said members or levers, substantially as set forth.

2. In a lock for automobiles the combination of a lever or member for controlling the transmission-gear of the automobile, a lever or member for varying the time of ignition and a locking means for simultaneously engaging both of said members, substantially as set forth.

3. In a lock for automobiles the combination of a member or lever for controlling the transmission-gear of the automobile, a member or lever for controlling the time of ignition of the igniter, a switch for closing an electric circuit through the igniter and a means for simultaneously engaging and holding said levers and switch, substantially as set forth.

4. In a lock for automobiles the combination of three levers for controlling respectively an emergency-brake, the transmission-gears and the time of the ignition of the igniter and a means for simultaneously engaging and holding all of said levers, substantially as set forth.

5. In a lock for automobiles the combination of three levers for respectively controlling an emergency-brake, the transmission-gears and the time of the ignition of the igniter, an electric switch for closing a circuit through the igniter and a locking means for simultaneously engaging and holding all of said levers and switch, substantially as set forth.

6. In a lock for automobiles the combination of an electric switch having two contacts, a lock for holding said switch on either of said contacts or in an intermediate or open position, comprising two stops adapted to engage on either or both sides of the switch and means for locking said stops in engagement with the switch, substantially as set forth.

7. In a lock for automobiles the combination of two or more levers or members for controlling the automobile and its mechanism, a hinged plate having means for simultaneously engaging two or more of said levers or members and means for locking said plate in its engaged position, substantially as set forth.

B. DORR COLBY.

Witnesses:
F. A. HOPKINS,
M. B. ALLSTADT.